Patented Nov. 14, 1933

1,935,189

UNITED STATES PATENT OFFICE 1,935,189

PROCESS OF MAKING RUBBER-FABRIC SHEET MATERIAL AND PRODUCT PRODUCED THEREBY

Chester E. Linscott, Cliftondale, Mass., assignor to American Rubber Company, East Cambridge, Mass., a corporation of Massachusetts No Drawing. Application July 15, 1931
Serial No. 551,064

14 Claims. (Cl. 91—68)

This invention relates to the production of rubber-fabric sheet material which is adapted to be made into articles of wearing apparel and which gives a product which possesses distinct characteristics of surface and general appearance and strength, and which, when combined with a fabric base, results in a new rubber-fabric material which is waterproof, has good appearance, exceptional strength and wearing qualities, and excellent ageing properties.

Rubber-fabric sheet material for use in the manufacture of wearing apparel has previously been made either by a calendering process wherein a sheet of broken down rubber is calendered onto a woven fabric base or by a spreading process wherein a rubber compound in an organic solvent is spread onto a woven fabric base by means of a doctor blade and the solvent removed from the spread surface. The rubber surface applied by the calendering process is usually a thicker coating and is generally applied to a heavier fabric base than in the spreading process and is used to produce for the most part a heavy duty rubber-fabric sheet material. In the spreading process, any number of films of rubber may be applied depending upon the thickness of the rubber surface desired, and any desired weight of fabric base may be used. The rubber surfaces produced by the calendering and spreading methods have a very smooth appearance, and masque to a great extent the woven appearance of the fabric underneath, thus producing a much less desirable appearance than for example, an oil-fabric material, where the oil coating follows the contour of the fabric base which is discernable through the coating and which does not present the smooth surface appearance of a calendered or spread sheet. Another disadvantage of the calendering and spreading methods is the great loss of strength of the rubber itself by virtue of the severe milling and breaking down necessary to produce the film for calendering or to prepare the rubber cement for spreading.

The present invention relates to the production of rubber fabric sheet material which is adapted to be made into articles of wearing apparel, by the deposition of the rubber surface on a fabric base from an aqueous dispersion of rubber, such as rubber latex. Rubber deposited from latex has great strength, toughness and resistance to wear, and a film deposited from an aqueous dispersion of rubber will follow the contour of the fabric base and produce a very attractive appearance. Latex rubber may be made to give a spread of uncured film that is firm, dry, non-tacky, easy to handle, and which is not readily damaged by sticking together, pressing, or cloth marking during spreading, curing, or finishing operations. Rubber-fabric material made from latex rubber provides many other distinct advantages both in manufacturing operations and in the product obtained over rubber-fabric material made from broken down rubber as will be apparent to persons skilled in the art.

With a preferred embodiment in mind but without intention to limit the scope of the invention beyond what may be required by the prior art, the invention briefly stated consists in depositing an aqueous dispersion of rubber, which preferably takes the form of latex which has been treated and compounded in a manner which makes it suitable for the purposes desired, in a single layer or in successive layers upon one or both sides of a fabric base material which may be knitted, woven or otherwise fabricated from fibrous material, and which will be herein referred to as "fabric", and drying the film of latex thus deposited. The rubber-fabric material may then be subjected to various treatments for producing the desired structure and finished appearance of the film. A deposit of rubber from an aqueous dispersion as distinguished from rubber from a calendering or spreading operation, consists of a film of the individual globules or aggregates of the same deposited from the dispersion. In the case of rubber deposited from latex, these individual globules are similar to little pellets of smoked sheet or other hard, crude rubbers. This film of individual globules or pellets which follows closely the contour of the fabric may be given a very desirable surface appearance by a series of finishing operations. The film may be dusted with a heavy metal salt of a fatty acid such as zinc stearate and vulcanized if it is desired to produce a bright finish. Then the film may be treated with sulphur chloride to harden it and with bromine to give it a desirable slip and freedom from drag. If it is desired to produce a moderately dull finish, the film, which may be dusted with zinc stearate, may be treated with a solvent such as carbon tetrachloride to swell the individual globules or aggregates of the same, and the thus treated surface may be dried and vulcanized and treated with sulphur chloride and bromine. To produce a moderately dull satin finish, the film while softened with the solvent such as carbon tetrachloride as above, may be passed under a scraper knife which scars the surface and produces a microscopic crepe effect on the surface of the film. The satin finish appearance thus obtained will be retained through the vulcanization and sulphur chloride and bromine treatment as above. The latex may be vulcanized, or unvulcanized with or without vulcanizing ingredients. If a latex containing vulcanizing ingredients is used, the vulcanization step may be made to take place during the drying of the film, or before or after any of the finishing operations as desired. If a latex without vulcanizing ingredients is used, a surface vulcanization may be applied in a manner well known in the art, at any desired stage of the finishing treatments.

The invention may be illustrated by the procedure which will now be described and which is intended to be exemplary of only one of the various ways in which the invention may be carried out:

Normal ammonia latex containing about 32% solids may be creamed once or more with alginates or pectin or Irish moss or other suitable creaming agents, preferably ammonium alginate (.15 parts dry alginate per 100 parts of rubber as latex), in a manner well known in the art, thus obtaining a creamed latex having approximately 60% solids. This creamed latex may be stabilized by the addition of a solution of .5 parts of "Nekal" in 1.5 parts of water to 100 parts of rubber as creamed latex. "Nekal" is the trade name for the condensation product of an aromatic hydrocarbon with an aliphatic alcohol in the presence of sulphuric acid. This stabilized creamed latex may be neutralized and made acid to a pH of 4 or 5 by the addition of a solution "Nekal" in water to which 37% formaldehyde has been added. In this solution 2 to 2.5 parts of "Nekal" per 100 parts of creamed latex are preferably used with enough of the formaldehyde to give the desired pH and twice as much water as formaldehyde. Latex, acidified with formaldehyde in this manner before compounding, provides a latex easier to handle with regard to after creaming effects and surface skimming on exposure to air than ordinary ammonia preserved latex and provides a better stability of the latex toward any zinc oxide that may be subsequently added. It also produces a softer rubber as the ultimate product.

The latex may be compounded with vulcanizing and accelerating agents and also filler and coloring materials may be added if desired. When an acidified latex is used, the compounding ingredients may be added in the form of a paste with "Nekal". For example, a coloring and curing compound of the following character and in the proportions indicated and prepared as described below may be added.

|  | Parts |
|---|---|
| Whiting | 50 |
| Zinc oxide | 2 |
| Sulphur | 1.5 |
| Zinc dimethyl dithiocarbamate | .5 |
| Thermatomic carbon | .1 |
| Chromium oxide green | 2.5 |
| Yellow pigment | .7 |
| Marine blue | .1 |
| "Nekal" | .65 |
| Water | 45.0 |

The above ingredients are exemplary merely of one particular type of suitable compound, it being understood that the amount of the various ingredients may be varied, the whiting may be replaced by any suitable filler, the zinc dimethyl dithiocarbamate replaced by any suitable accelerator, and the various coloring materials replaced by others to give the desired color. In the above example the finished material will have a brownish-green or olive drab color. In mixing the above compound the dry powders may be weighed and mixed dry, then the water added and the mix run through a paint mill rapidly, after which it may be put through a pebble or tight paint mill to grind it finely before addition to a latex compound previously prepared as in the manner described. It is often desirable to produce a colorless transparent film of latex rubber on the fabric and in such a case where a vulcanizable film is desired, only sufficient compounding materials to produce a vulcanizable compound need be added. In such a case, a compound of the following character may be added:

|  | Parts |
|---|---|
| Zinc oxide | 1.0 |
| Sulphur | 1.25 |
| Zinc dimethyl dithiocarbamate | .75 |
| "Nekal" | .25 |
| Water | 3.0 |

The above ingredients are exemplary merely of another particular type of suitable compound, and as in the previous example, the amounts of the various ingredients may be varied as desired.

Further compounding of the latex to produce a film having the desired properties may be accomplished by the addition of such substances as antioxidants, soap, wax and softeners, these substances being added preferably in the form of an emulsion. Merely by way of example, the following ingredients, prepared as described below, may be added:

|  | Parts |
|---|---|
| Anti-oxidant | .3 |
| Hexa-hydro phenol | .35 |
| Oleic acid | 3.0 |
| Ammonia | 2.0 |
| Water | .2 |
| Wax | .5 |
| Light mineral oil | 8.0 |

The anti oxidant above mentioned may be of any suitable kind. I have found the condensation product of acetone and diphenyl amine, a well-known anti-oxidant, highly satisfactory. The wax may be a mineral wax such as paraffin wax. The hexa hydro phenol above mentioned acts as a deodorizing agent and assists in the formation of the emulsion. In preparing such an emulsion the oleic acid may be weighed out and water added, following which the ammonia, hexa hydro phenol, and anti-oxidant may be successively added and the mixture warmed. The wax may be melted in the mineral oil and is then preferably added to the previously mixed ingredients at a slightly elevated temperature, around 85° C. with the aid of a stirrer.

In a latex, compounded as above, the "Nekal" acts as a stabilizer on either the alkaline or acid side, and the formaldehyde is used to neutralize the ammonia and to render the latex acid. The whiting as indicated may be added as a filler. The hexa hydro phenol assists the ammonium oleate formed from the oleic acid and ammonia in the emulsification of the added wax, and the wax exerts a protective function and resists any cracking action in the finished material. The oil, in conjunction with the oleic acid, acts as a softener. Rubber deposited from acid latex, especially if prepared as above described, presents a most desirable film. I may however, prepare coating compositions from other acid latices such as those described and claimed in the patents to McGavack and Shive Nos. 1,699,368 and 1,699,369 dated January 15, 1929. I may also prepare coating compositions from normal, alkaline, concentrated, or creamed latices or from artificial rubber dispersions as well as from acid latices. I may prepare coating compositions from latices without vulcanizing ingredients and give such coating a subsequent surface vulcanization in a manner well known in the art. I may prepare coating compositions from vulcanized latex whence subsequent vulcanization operations will be unnecessary.

The latex composition may be applied to fabrics of various kinds, for example to unbleached sheeting, by means of suitable coating knives in order to provide a base coating on the fabric. The sheeting may be run through an ordinary type of spreading apparatus having a sharp doctor blade, and the latex which may be compounded to contain a relatively high percentage of solids, for example, about 35 to 55% solids may be applied as above described, after which the fabric may be dried on a spreader having sufficient heating surface to thoroughly drive off all the water in the latex. A base coating thus applied will fill in and cover the interstices of the fabric without substantial penetration, and will prevent subsequent coatings from striking through the fabric. After the base coat has thoroughly filled in the fabric so that striking through is no longer possible, subsequent coatings may be applied in as many successive operations as are necessary to give the required weight of film.

A fabric coated on one side may be satisfactory but the fabric base is preferably coated on both sides, and in such case, the other side of the fabric may be directly coated with a latex composition similar to that used on the first side. However, it is desirable to interlock the films on the opposite sides of the fabric base through the interstices of the fabric and to produce this result the base coat on the reverse side is preferably applied from a latex composition with a lower solids content, for example 20 to 25% solids content. This will cause a penetration and impregnation of the fabric and interlock the newly deposited film to the film deposited on the first side, and thus prevent any possible subsequent wicking into the finished fabric as for example through the stitch holes of wearing apparel made from the finished sheet material. Such a base coat on the reverse side from a lower solids content dispersion is preferably applied heavily and then driven into the fabric by passing under a slanted scraper knife in order to obtain the maximum pentration and impregnation of the fabric base. The top coats on the reverse side may then be applied from a dispersion with a higher solids content such as 35 to 55% solids, similar to the dispersions used in the coats on the first side.

The number of coats on the one side of a material coated only on one side, or the number of coats on each side of a material coated on both sides depends entirely on the type of material desired and the type of fabric base used. I have found that four to six coats on the first side and two or three coats on the reverse side make an excellent rubber-fabric for raincoats. Such a fabric may not be appreciably thicker than oil coated cloth of the same weight and weave due to the extremely thin rubber film that it is possible to deposit from latex.

As has been stated, latex containing vulcanizing ingredients, vulcanized latex, or latex without vulcanizing ingredients, may be used. If vulcanized latex is used, no further vulcanization treatment is necessary. If a latex without vulcanizing ingredients is used, a surface vulcanization may be accomplished in a manner well known in the art, as for example by a sulphur chloride gas or solution treatment. If latex containing vulcanizing ingredients is used, it may be so compounded as to cure or vulcanize as a result of the drying of the film after the spreading operation. Such an accelerator as zinc dimethyl dithiocarbamate, used in the above examples, permits vulcanization during drying. An accelerator may be used that will not cause vulcanization under drying conditions, and in such a case the dried films may be vulcanized before or after the coated material has been manufactured into the finished articles. A coating of rubber deposited from an aqueous dispersion as above described will present a bright appearance. A dusty appearance may be produced by applying the conventional types of dust such as cornstarch, potato starch, tapioca flour and so forth, to the coated surface, preferably before vulcanization. The rubber fabric thus obtained may be considered the final product, if desired. It is preferred however, to harden the surface making it firmer and more difficult to scar, and also to impart a slip to the surface in order that it may be drawn over other materials with ease and without any apparent drag.

In order to obtain the firmness and slip necessary in a rubber-fabric material that is to be used in making protective apparel, the following treatment, which also gives the fabric a unique and slightly crackly feeling that conveys the impression of substance and body even when of very light material, may be applied. The surface to be treated is spread with a solution of sulphur chloride in an organic solvent, for example, a solution of 1% sulphuric chloride in carbon tetrachloride, thus producing a hard and firm surface. The surface is also preferably spread with a solution of bromine in an organic solvent, for example a solution of 2% bromine in carbon tetrachloride, thus producing the desired slip and freedom from drag. In practice, it is preferred to treat the material with a solution, such as a carbon tetrachloride solution containing sulphur chloride, followed by a carbon tetrachloride solution containing bromine, but the material may be treated with only one of the solutions or with a solution containing both sulphur chloride and bromine if desired. The concentration of the solutions may be varied as desired. The material is then dried after such treatment. The above treatment may be applied to unvulcanized or vulcanized material but if it is applied to unvulcanized material vulcanization is made to take place after such treatment in order to produce the final product.

The deposited and dried film on the one side of a material coated on only one side, or on one or both sides of a material coated on two sides, may be treated as follows to produce a most desirable surface structure and appearance, this treatment preferably preceding the treatment with sulphur chloride and/or bromine described above. The vulcanization, if the film is deposited from unvulcanized latex, may take place as has been stated at any desired stage, but with the following surface structure treatment it is preferred to vulcanize after such treatment and before any sulphur chloride and bromine treatment as above. The dried coating deposited from the aqueous dispersion of rubber is treated with a heavy metal salt of a fatty acid such as zinc stearate by dusting or by treating with an organic solvent in which the salt is dissolved. If the fabric is coated on both sides the zinc stearate may be dusted on the one coated surface before the other surface is coated. Then the second surface may be dusted or otherwise treated after the final coat thereon has dried. Of course, the zinc stearate treatment may be applied to both sides after both rubber coats have been applied. If it is desired to produce merely a bright finish of the final product, the thus treated coatings are given the final surface treatments with sulphur chloride and bromine described above preceded by vulcanization, if necessary. If it is desired to produce a moderately dull finish, the film, which may or may not be first treated with zinc stearate is treated with solvent by passing the coated fabric through a spreading machine and spreading with an organic solvent such as carbon tetrachloride. One or more coats of solvent may be spread in this manner. The solvent treatment brings out the particle structure through a swelling of the individual particles and produces more pronouncedly at the surface of the finished material a dull appearance. The fabric may, if desired, be dried and it will to a great extent retain this structure and dull appearance. The fabric with the rubber film softened with solvent as above is preferably passed under a scraper knife, before drying and this will produce an additional microscopic crepe surface effect by virtue of this scarring treatment on the swelled particles and a more pronounced dull satin finish of the finished article than by the solvent treatment alone or with the zinc stearate will result. The vulcanization may now be made to take place as above described before the final sulphur chloride and bromine treatment, and this may be done in a suitable manner as in steam or by festooning in an open heater for a suitable interval of time under suitable temperature conditions, in a manner well known in the art. The film treated with zinc stearate and solvent, and scarred, is preferably vulcanized after such treatment and then treated with sulphur chloride and bromine as above.

The sheet material produced by the practice of this invention has a tough and wear resisting surface of grainless rubber which sinks down into the uneven and hollow spaces of the fabric weave so that the entire surfacing is more or less of irregular outline and generally follows the contours of the fabric instead of completely filling up irregularities and producing a substantially plain and smooth surface as in the case of calendered or cement spread stock. In addition the latex applied in the manner described, has a distinct transparent appearance when the compound is not pigmented. It may be given dull satin finish appearance. It may be hardened and given a unique and slightly crackly feel giving the impression of substance and body. It may also be given the necessary slip so important in wearing apparel. The exterior surfaces of the coatings vary in contour with the number of coats applied, with the particular composition employed and with the weight and characteristics of the fabric material to which the rubber coatings have been applied.

With the detailed disclosure set forth above, it is obvious that modifications will suggest themselves and it is not desired to limit the invention, except as set forth in the appended claims.

Having thus described my invention, what I claim and desire to protect by Letters Patent is:

1. Sheet material comprising a fibrous sheet coated on both sides with a solids deposit of rubber from latex having a sub-normal content of water solubles, the deposit on one side being insufficient in thickness to mask or completely level up the surface irregularities of the fibrous material, and the rubber of said last named deposit being at least superficially combined with a heavy metal soap and a halogen.

2. A method of hardening and imparting a desired slip to the surface of a fabric coated with the solids deposit of an aqueous dispersion of rubber comprising the steps of treating the surface with a heavy metal salt of a fatty acid and then with sulphur chloride and bromine in organic solvent.

3. A method of hardening and imparting a desired slip to the surface of a fabric coated with the solids deposit of an aqueous dispersion of rubber comprising the steps of treating the surface with a heavy metal salt of a fatty acid, and at least superficially halogenating the thus treated coating.

4. A method of producing a moderately dull, satin finish on the surface of a fabric coated with dried solids deposit of an aqueous dispersion of rubber comprising the steps of treating the surface with a heavy metal salt of fatty acid, swelling and softening the particles or aggregates of particles of the deposit by treatment with organic solvent, scarring the softened surface to produce a microscopic crepe effect thereon, and drying the thus treated surface.

5. A method of treating fabric coated with the dried solids deposit of an aqueous dispersion of rubber comprising treating the deposit with a heavy metal salt of a fatty acid, vulcanizing the deposit, and treating the vulcanized deposit with sulphur chloride and bromine.

6. A method of treating fabric coated with the solids deposit of an aqueous dispersion of rubber, comprising treating the deposit with a heavy metal salt of a fatty acid, then vulcanizing the deposit, and at least superficially halogenating the thus treated deposit.

7. A method of treating fabric coated with the dried solids deposit of an aqueous dispersion of rubber comprising treating the deposit with a heavy metal salt of a fatty acid, treating the deposit with an organic solvent, scarring the surface, drying out the solvent on the deposit, vulcanizing the deposit, and treating the deposit with sulphur chloride and bromine.

8. A method of treating fabric coated with the solids deposit of an aqueous dispersion of rubber, comprising treating the deposit with a heavy metal salt of a fatty acid, treating the deposit with an organic solvent, scouring the surface, drying out the solvent on the deposit, vulcanizing the deposit, and at least superficially halogenating the deposit.

9. A method of treating fabric coated with the solids deposit of an aqueous dispersion of rubber, comprising treating the deposit with a heavy metal salt of a fatty acid, then treating the deposit with an organic solvent, vulcanizing the thus treated deposit, and at least superficially halogenating the vulcanized deposit.

10. A method of treating fabric coated with the solids deposit of an aqueous dispersion of rubber, comprising treating the deposit with a heavy metal salt of a fatty acid, then treating the deposit with an organic solvent, and at least superficially halogenating the thus treated deposit.

11. Sheet material comprising a fibrous sheet coated with a solids deposit of rubber from an aqueous dispersion of rubber, said deposit being at least superficially combined with a heavy metal soap and a halogen.

12. Sheet material comprising a fibrous sheet coated with a solids deposit of rubber from a latex having a sub-normal content of water solubles, said deposit being at least superficially combined with a heavy metal soap and a halogen.

13. Sheet material comprising a fibrous sheet coated with a solids deposit of rubber from an aqueous dispersion of rubber, said deposit being vulcanized and at least superficially combined with a heavy metal soap and a halogen.

14. Sheet material comprising a fibrous sheet coated with a solids deposit of rubber from a latex having a sub-normal content of water solubles, said deposit being vulcanized and at least superficially combined with a heavy metal soap and a halogen.

CHESTER E. LINSCOTT.